Jan. 2, 1968   H. BLOOMFIELD   3,361,126
CHAFING DISH STAND
Filed March 28, 1966

INVENTOR.
HAROLD BLOOMFIELD
BY
Edward C. Threedy
HIS ATTORNEY.

3,361,126
CHAFING DISH STAND
Harold Bloomfield, Chicago, Ill., assignor to Bloomfield Industries, Inc., Chicago, Ill., a corporation of Illinois
Filed Mar. 28, 1966, Ser. No. 538,073
4 Claims. (Cl. 126—261)

ABSTRACT OF THE DISCLOSURE

An arm structure for pivotally connecting a heating element container to a leg member of a chafing dish stand with the container having a cover pivotally connected independently to the arm, and a stop provided by the leg of the stand to limit pivotal movement of, and to position, the arm and container beneath the dish on the stand.

---

More specifically, my invention has to do with a simplified and inexpensive arrangement for removably supporting the heating means beneath the dish in a manner such that the heating means, which is in the form of a can containing an inflammable substance, can be easily and safely pivoted from beneath the dish to permit removal or replacement of the can.

Another and equally important object of the invention is the provision of a holder for a can containing an inflammable substance which is pivotally connected to an adjacent leg of the chafing dish stand and which holder includes a container for the can, provided with a removable cover and in which cover there is an arrangement for regulating the amount of heat to be directed to the dish supported by the stand.

Other objects will appear hereinafter.

The invention consists in the novel arrangement and combination of parts to be hereinafter described and claimed.

The invention will be best understood by a reference to the accompanying drawings showing the preferred form of construction, and in which drawings.

Figure 1:
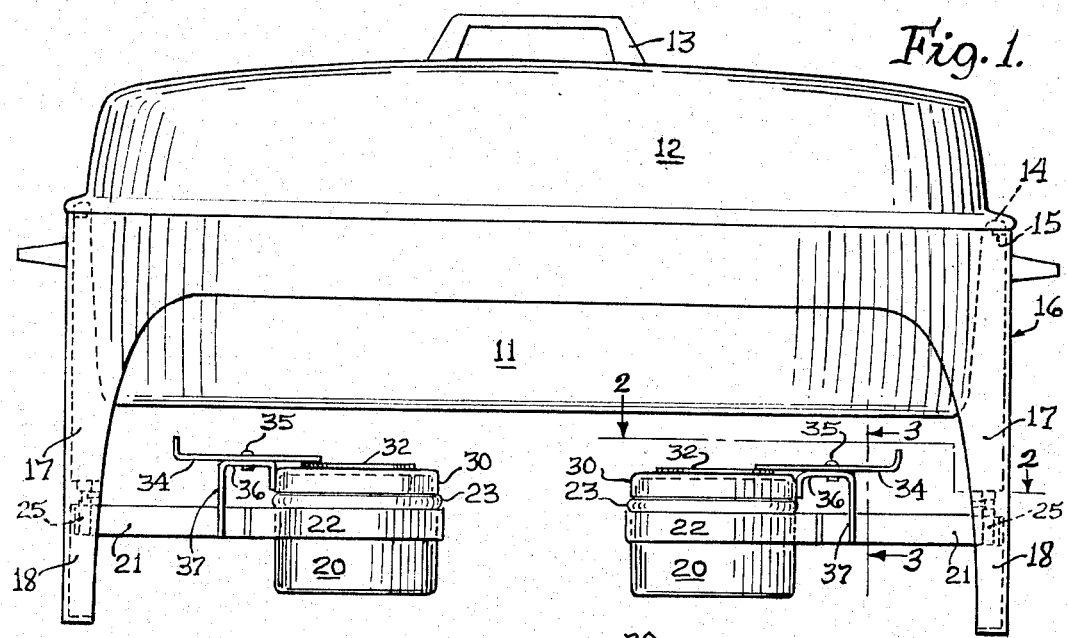
FIG. 1 is an elevational view of the invention.

The several objects of my invention are accomplished by the preferred form of construction shown in the accompanying drawings. In this connection the chafing dish is indicated at 11. The dish is provided with a cover 12 having a suitable handle 13. The upper peripheral edge portion of the dish provides an outwardly extending bead 14 of any conventional form and which serves to support the dish from the top edge 15 of the stand 16. The stand 16 includes legs 17, the number of which depends upon the design, shape and size of the chafing dish. These legs 17 are preferably channel-shaped in cross section.

Figures 2, 3:
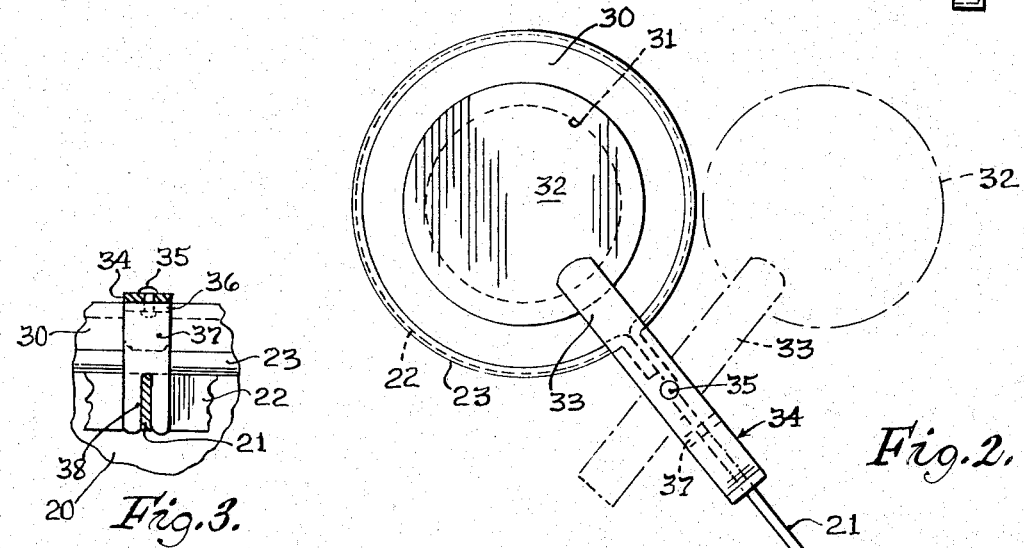
FIG. 2 is a fragmentary sectional detail view taken substantially on line 2—2 of FIG. 1.
FIG. 3 is a fragmentary sectional detail view taken substantially on line 3—3 of FIG. 1.

As illustrated in FIGS. 1 and 2, there is provided adjacent the lower end portion 18 of the leg 17 an integral webbing 19 from which is pivotally supported from one or more of the legs a container 20 which is adapted to receive a can of inflammable substance and which is commonly referred to as "canned heat."

The construction for supporting the container 20 from the respective webbing 19 includes an elongated arm 21 having its inner end portion circularly bent as at 22 to removably embrace the container 20 below an integral bead 23 thereof. The opposite end of the arm 21 is bent as at 24 to partially embrace a pintle 25, the end portion being integrally connected to the pintle 25. The pintle 25 extends above the arm 21 and projects into an opening 26, the diameter of the pintle 25 and the opening 26 being such as to permit free rotation of the pintle 25 within the opening 26.

Figure 4:
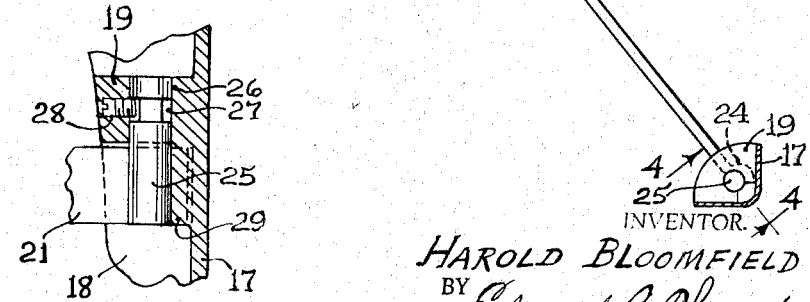
FIG. 4 is an enlarged fragmentary sectional detail view taken substantially on line 4—4 of FIG. 2.

To prevent displacement of the pintle 25 from the opening 26, there is provided in the upper end portion of the pintle 25 an annular groove 27 into which projects the end portion of a set screw 28 carried by the webbing 19 (see FIG. 4). The webbing 19 provides an integral depending stop 29 which is arranged in the path of the curved portion 24.

The arrangement is such that when the arm 21 has been pivoted inwardly beneath the dish 11, the curved portion 24 will engage the stop 29 and properly locate the container 20 with the canned heat therein beneath the dish 11.

While I have shown in the drawings two of the legs 17 of the stand 16 supporting the canned heat container beneath the dish, it is to be understood that the number of containers employed will depend upon the size or diameter of the dish, as hereinbefore stated. If the dish be of a small size, then it may be necessary to use but one canned heat container.

The container 20 is provided with a removable cover 30 which is provided with a central opening 31 through which the heat from the container of canned heat passes. To regulate the passage of heat through the opening 31, there is provided a damper 32 in the form of a relatively flat plate fixedly secured to one end portion 33 of a handle 34.

The handle 34 is pivoted as at 35 to a bracket 36 connected to the cover 30 and formed substantially U-shaped in side elevation, to provide a depending finger 37. This finger 37 is slotted longitudinally as at 38 (FIG. 3) and when the cover 30 is in position upon the container 20, the arm 21 will engage in the slot 38. This arrangement permits adjustment of the damper 32 through the pivotal action of the handle 34, whereby to enlarge or decrease the area of the opening 31 for the purposes hereinbefore stated.

From the foregoing description, it will be apparent that to load or remove the container from the chafing dish stand, such operation may be quickly and safely performed by pivoting the container 20 from beneath the chafing dish to a position where the cover 30 of the container 20 may be lifted and the container of canned heat removed from the container 20 and replaced with a full can.

Should it be found in the use of the chafing dish and its stand that less heat is required for the intended purpose, the flow of heat from the canned heat may be regulated easily and safely by adjusting the damper 32 relative to the opening 31 by pivoting the handle 34 of the damper 32.

The shape and design of the chafing dish and its stand constitutes no part of my invention, and it is to be understood that my invention may be employed with chafing dish stands of various shapes and designs.

While I have illustrated and described the preferred form of construction for carrying my invention into effect, this is capable of variation and modification without departing from the spirit of the invention. I therefore, do not wish to be limited to the precise details of construction set forth, but desire to avail myself of such variations and modifications as come within the scope of the appended claims.

Having thus described my invention, what I claim as new and desire to protect by Letters Patent is:

1. A chafing dish stand comprising
  (a) a body having supporting legs,
  (b) a canned heat container rotatably supported from at least one of said legs,
  (c) the support for said container comprising a webbing provided by said leg and having an opening formed therein, (d) an arm having an inner end portion formed to embrace said container to provide a holder therefor, (e) a pintle rotatably positioned in said opening, (f) the outer end portion of said arm being integrally connected to said pintle, (g) and stop means provided by said webbing and disposed in the path of movement of said outer end portion of said arm to limit positioning of said container beneath a dish supported by said body.

2. A chafing dish stand comprising (a) a body having supporting legs, (b) a canned heat container rotatably supported from at least one of said legs, (c) the support for said container comprising a webbing provided by said leg and having an opening formed therein, (d) an arm having an inner end portion formed to embrace said container to provide a holder therefor, (e) a pintle rotatably positioned in said opening, (f) the outer end portion of said arm being integrally connected to said pintle, (g) a removable cover for said container, said cover having an opening formed therein, (h) a bracket carried by said cover and having a slotted end portion for the reception of said arm, (i) a damper for said cover opening, (j) and a handle carrying said damper and having pivotal connection with said bracket whereby adjustment of said handle with respect to said bracket will effect adjustment of said damper with respect to said cover opening.

3. A chafing dish stand as defined in claim 2 characterized by the provision of an annular bead provided by said container and engageable with said inner end portion of said arm embracing the container, for removably supporting the container within said curved inner end portion.

4. A chafing dish stand comprising (a) a body having supporting legs, (b) a canned heat container rotatably supported from at least one of said legs, (c) the support for said container comprising a webbing provided by said leg and having an opening formed therein, (d) an arm having an inner end portion formed to embrace said container to provide a holder therefor, (e) a pintle rotatably positioned in said opening, (f) the outer end portion of said arm being integrally connected to said pintle, (g) said pintle provided with an annular groove and said webbing has threaded therein a set screw, the inner end of which projects into said groove.

References Cited

UNITED STATES PATENTS

| | | | |
|---|---|---|---|
| 213,904 | 4/1879 | Jarvis | 126—246 |
| 725,335 | 4/1903 | Glaessner | 126—43 |
| 944,307 | 12/1909 | Bauer | 126—265 |
| 3,152,585 | 10/1964 | Harrison | 126—43 X |

FOREIGN PATENTS

| | | |
|---|---|---|
| 7,823 | 1912 | Great Britain. |
| 17,457 | 1901 | Great Britain. |

CHARLES J. MYHRE, *Primary Examiner.*